(12) United States Patent
SanCartier

(10) Patent No.: US 9,027,995 B2
(45) Date of Patent: May 12, 2015

(54) STOWABLE MOTORCYCLE COVER

(71) Applicant: Custom Color Caps, Inc., Hugo, MN (US)

(72) Inventor: Joseph Darcy SanCartier, Hugo, MN (US)

(73) Assignee: Custom Color Caps, Inc., Hugo, MN (US)

( * ) Notice: Subject to any disclaimer, the term of this patent is extended or adjusted under 35 U.S.C. 154(b) by 0 days.

(21) Appl. No.: 14/035,132

(22) Filed: Sep. 24, 2013

(65) Prior Publication Data

US 2014/0231478 A1 Aug. 21, 2014

Related U.S. Application Data

(63) Continuation-in-part of application No. 13/771,955, filed on Feb. 20, 2013.

(51) Int. Cl.
*A47C 31/00* (2006.01)
*B62J 19/00* (2006.01)

(52) U.S. Cl.
CPC ....................... *B62J 19/00* (2013.01)

(58) Field of Classification Search
USPC ............ 297/184.1, 184.11, 219.11; 296/78.1, 296/100.04, 136.04; 150/167
See application file for complete search history.

(56) References Cited

U.S. PATENT DOCUMENTS

| | | | | |
|---|---|---|---|---|
| 3,884,523 A * | 5/1975 | Allen | ........................ | 296/136.04 |
| 4,059,207 A * | 11/1977 | Jackson et al. | ................. | 224/413 |
| 4,171,145 A * | 10/1979 | Pearson, Sr. | .................. | 296/78.1 |
| 4,283,084 A * | 8/1981 | Gallagher | ..................... | 296/78.1 |
| 4,792,040 A * | 12/1988 | Wagstaff, III | ................. | 206/223 |
| 5,052,738 A * | 10/1991 | Li | .................. | 296/78.1 |
| D341,552 S | 11/1993 | Schardt | | |
| 5,562,139 A | 10/1996 | Cseri | | |
| 5,588,698 A * | 12/1996 | Hsueh | ....................... | 297/184.11 |
| 5,634,685 A | 6/1997 | Herring | | |
| 5,676,288 A * | 10/1997 | Spirk | ............................. | 224/463 |
| 5,795,008 A * | 8/1998 | Allen | .............................. | 296/98 |
| 5,795,009 A * | 8/1998 | Sack et al. | .................... | 296/78.1 |
| 5,820,200 A * | 10/1998 | Zubillaga et al. | ......... | 296/136.03 |
| 6,012,770 A * | 1/2000 | Rubin | ....................... | 297/184.11 |
| 6,253,977 B1 * | 7/2001 | Greger et al. | ................. | 224/413 |
| 6,516,844 B1 * | 2/2003 | Henry | ........................... | 150/167 |
| D494,128 S | 8/2004 | Berger | | |
| 7,204,551 B2 * | 4/2007 | Kahan | ....................... | 297/184.11 |

(Continued)

OTHER PUBLICATIONS

"Dennis Kirk Catalog—Parts and Accessories for Harley-Davidson(r) Motorcycles", (2012), 990-994.

*Primary Examiner* — Laurie Cranmer
(74) *Attorney, Agent, or Firm* — Schwegman Lundberg & Woessner, P.A.

(57) ABSTRACT

A system for storing a cover for a motorcycle comprises a storage case mounted to a motorcycle, wherein the storage case includes a main housing and a lid, and a storage pouch defining an inner cavity and at least one opening, wherein the storage pouch is configured to be mounted to the lid of the storage case. The system further comprises a cover that is stowable in the inner cavity of the storage pouch in a stowed mode of operation and configured to extend around at least a portion of the motorcycle in a deployed mode of operation, a mounting bracket mountable to an inner surface of the lid of the storage case, and a retaining member including a first portion mountable to the mounting bracket and a second portion mountable to the main housing of the storage case.

20 Claims, 15 Drawing Sheets

(56) References Cited

U.S. PATENT DOCUMENTS

| | | | |
|---|---|---|---|
| 7,213,868 B1 * | 5/2007 | Tan | 296/136.04 |
| 7,252,171 B2 | 8/2007 | Augustine, Jr. | |
| 7,862,100 B1 * | 1/2011 | Smith | 296/136.1 |
| D642,969 S * | 8/2011 | Saggau et al. | D12/401 |
| 8,132,839 B2 * | 3/2012 | Penman | 296/100.04 |
| 2011/0148138 A1 * | 6/2011 | Penman | 296/136.04 |
| 2012/0055598 A1 * | 3/2012 | Teske | 150/167 |

\* cited by examiner

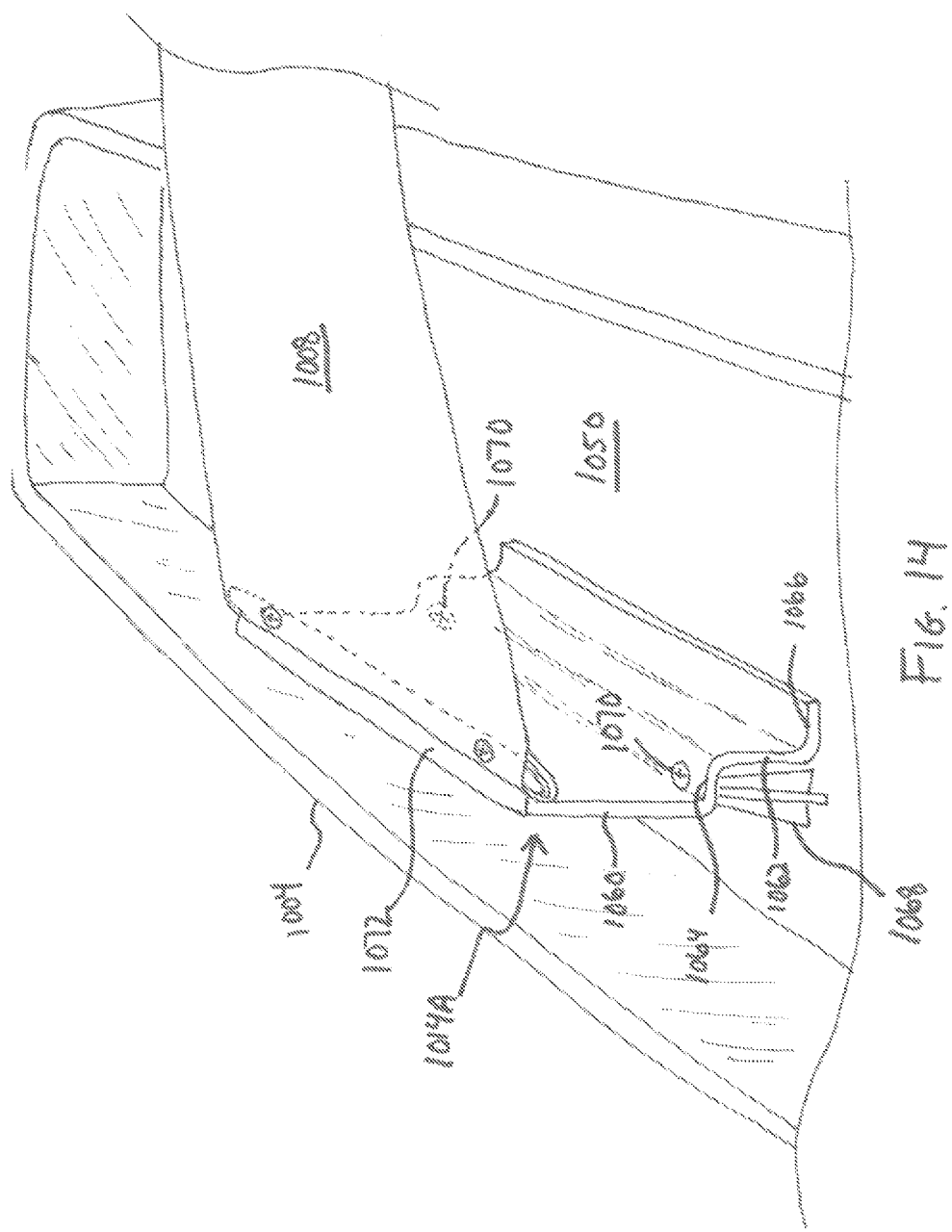

STOWABLE MOTORCYCLE COVER

CLAIM OF PRIORITY

This application claims the benefit of U.S. patent application Ser. No. 13/771,955, entitled "MOTORCYCLE COVER STOWABLE IN A SEAT CUSHION", and filed on Feb. 20, 2013, the benefit of priority of which is claimed hereby, and is incorporated by reference herein in its entirety.

TECHNICAL FIELD

Embodiments pertain to motor vehicles, and more particularly to motor vehicles wherein two wheels occupy, during straight-ahead travel of the vehicle, a plane which is inclusive of, or parallel to, the longitudinal axis of the vehicle.

BACKGROUND

When traveling by motorcycle, it is often desirable to cover the motorcycle when it is parked, such as outside a hotel. Covering the motorcycle can both keep meddlers away from the exposed instruments, and maintain the seat and instruments in a dry state. A further benefit provided by a cover is to provide protection from ultraviolet rays from the sun, which can degrade polymers.

In an attempt to meet these needs, a common practice among riders has been to bring a cover with on long trips. The cover is stowed and extracted from the onboard storage compartments, such as the top case or saddle bags, and occupies space that could be otherwise used for articles such as clothing. If the cover is dirty or wet, it can soil other articles stored in the common space. It would be better if the cover used little if any storage space, and if it was isolated from other articles in storage. Further, it is desirable to provide a cover that is easy to install, even in the wind.

U.S. Pat. No. 7,252,171 to Augustin, Jr. discloses a backrest cushion mounted on the top case of a motorcycle, and optionally on a low step-up one-piece motorcycle seat, including a backrest cushion housing having a front surface, a bottom surface, left and right side walls, a front, and a cavity defined by each of the surfaces; and an access means located on the front surface of the backrest cushion facing the seat of the motorcycle; where the bottom surface is elongated and arcuate in its elongated axis to conform to the configuration of the motorcycle backrest and the backrest cushion is attached to the backrest such that the bottom surface of the backrest cushion is in contact with a top portion of the motorcycle backrest. The design is incompatible with two-up travel, is difficult to retro-fit, and does not provide adequate adjustability for rider comfort.

Others, such as disclosed in U.S. Pat. Nos. 5,664,715, 6,484,914, 5,664,715, and 6,443,344, have devised luggage racks that mount onto the top case of a motorcycle. However, luggage racks are undesirable because the contents thereon are exposed to the weather and are otherwise not protected from the elements and debris that may come in contact with the contents on the luggage rack while traveling.

U.S. Pat. No. 6,729,516 B2 to Hanagan discloses a backrest cushion for a motorcycle that can be removably mounted onto the top case. However, the design of the backrest cushion is such that if a sufficient amount of force comes in contact with the backrest cushion, the backrest cushion may become dislodged from the backrest and/or the cover may become disengaged, exposing the contents to the elements and/or causing them to be expelled from the backrest cushion.

U.S. Pat. No. 4,726,439 to Iwao et al. discloses trunk structures in scooter-type vehicles. However, this type of structure can only be used in that type of a large-bodied two-wheeled vehicle, and is not appropriate for the sleek, aerodynamic aesthetics desired with a motorcycle.

U.S. Pat. No. 5,147,077 to Nakajima et al. discloses a storage box for a motorcycle where the storage box is located above the engine; in other words, in between the seat and, therefore, the driver of the motorcycle and the handlebars of the motorcycle. This design has the potential of making the motorcycle difficult to drive and, in some cases, dangerous, whereby the rider cannot react quickly to hazards with which he may come in contact.

Therefore, there remains in the art a need for an easy-to-store cover that does not occupy space used to store other articles, that does not expose other articles to moisture and soil from the cover, and that is easy to install.

Overview

To better illustrate the motorcycle cover assembly disclosed herein, a non-limiting list of examples is provided here:

In Example 1, a system for storing a cover for a motorcycle can be provided that includes a storage case mounted to a motorcycle, wherein the storage case includes a main housing and a lid, and a storage pouch defining an inner cavity and at least one opening, wherein the storage pouch is configured to be mounted to the lid of the storage case. The system further includes a cover that is stowable in the inner cavity of the storage pouch in a stowed mode of operation and configured to extend around at least a portion of the motorcycle in a deployed mode of operation, a mounting bracket mountable to an inner surface of the lid of the storage case, and a retaining member including a first portion mountable to the mounting bracket and a second portion mountable to the main housing of the storage case.

In Example 2, the system of Example 1 is optionally configured such that the storage case is a side case of the motorcycle.

In Example 3, the system of Example 1 is optionally configured such that the storage case is a top case of the motorcycle.

In Example 4, the system of any one of or any combination of Examples 1-3 is optionally configured such that in the deployed mode of operation the cover extends around at least one of a front of the motorcycle and a back of the motorcycle.

In Example 5, the system of Example 4 is optionally configured such that in the deployed mode of operation the cover extends around the front of the motorcycle and the back of the motorcycle.

In Example 6, the system of any one of or any combination of Examples 1-5 is optionally configured such that the at least one opening of the storage pouch includes a closure.

In Example 7, the system of Example 6 is optionally configured such that the closure comprises a zipper.

In Example 8, the system of any one of or any combination of Examples 6-7 is optionally configured such that the closure extends around an end portion of the storage pouch.

In Example 9, the system of any one of or any combination of Examples 1-8 is optionally configured such that the storage pouch is mountable to the inner surface of the lid with a hook-and-loop fastener.

In Example 10, the system of any one of or any combination of Examples 1-9 is optionally configured such that at least a portion of the mounting bracket extends substantially perpendicular to the inner surface of the lid.

In Example 11, the system of any one of or any combination of Examples 1-10 is optionally configured such that the storage pouch includes a first end portion, a second end portion, and a center portion, wherein a width of the center portion is less than a width of the first and second end portions.

In Example 12, a cover assembly for a motorcycle can be provided that includes a storage pouch defining an inner cavity and at least one opening, a cover stowable in the inner cavity of the storage pouch, and a mounting member positionable within a motorcycle storage case, the motorcycle storage case including a main housing and a lid, the mounting member configured to be secured to an inner surface of the lid. The cover assembly further includes a retaining member configured to extend between the mounting member and the main housing of the motorcycle storage case, and at least one attachment member configured to allow removable attachment of the storage pouch to the inner surface of the lid.

In Example 13, the cover assembly of Example 12 is optionally configured such that the at least one opening of the storage pouch includes a closure.

In Example 14, the cover assembly of Example 13 is optionally configured such that the closure comprises a zipper.

In Example 15, the cover assembly of any one of or any combination of Examples 12-14 is optionally configured such that the mounting member is a mounting bracket configured to extend from the inner surface of the lid and provide a mounting location for the retaining member that is spaced apart from the inner surface.

In Example 16, the cover assembly of Example 15 is optionally configured to include at least one fastener for securing the mounting bracket to the inner surface of the lid.

In Example 17, the cover assembly of Example 16 is optionally configured such that the at least one fastener is a threaded fastener.

In Example 18, the cover assembly of any one of or any combination of Examples 12-17 is optionally configured such that the at least one attachment member on the storage pouch comprises a first portion of a hook-and-loop fastener, and wherein a second portion of the hook-and-loop fastener is disposed on the inner surface of the lid.

In Example 19, the cover assembly of any one of or any combination of Examples 12-18 is optionally configured such that the storage pouch is positionable in a space formed between the inner surface of the lid and the retaining member.

In Example 20, a cover assembly for a motorcycle can be provided that includes a storage pouch defining an inner cavity and at least one access opening, wherein the opening includes a closure mechanism for temporarily closing the access opening, and a cover positionable in the inner cavity of the storage pouch in a stowed mode of operation, the cover configured to extend around at least a portion of a motorcycle in a deployed mode of operation. The cover assembly further includes a mounting member positionable within a motorcycle storage case including a main housing and a lid, wherein the mounting member is configured to be secured to an inner surface of the lid, and a retaining member configured to extend between the mounting member and the main housing of the motorcycle storage case. The storage pouch includes at least one attachment member configured to allow removable attachment of the storage pouch to the inner surface of the lid.

In Example 21, the system or assembly of any one of or any combination of Examples 1-20 is optionally configured such that all elements or options recited are available to use or select from.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 14 shows an enlarged perspective view of a portion of the motorcycle storage case and the cover assembly, according to an example.

DETAILED DESCRIPTION

The present disclosure is directed to a backrest cushion formed from a backrest cushion housing that can be stuffed, at least partially, with a cover stowed inside the housing to provide backrest padding for a rider. The housing can include a closure that can be opened and closed to stow and retract the cover. At least a portion of the backrest cushion can be attached to a backrest such as the top case of a motorcycle.

The backrest cushion can be attached by way of one or more fasteners and can be retrofit to existing cushion mounting points, such as those coupled with a top case to affix a cushion for a passenger to the top case. Thus, examples of the present subject matter provide operators with an easy-to-use option for upgrading their motorcycle by replacing an existing lumbar seat cushion with a replacement cushion that can house a cover for the motorcycle.

Figure 1:
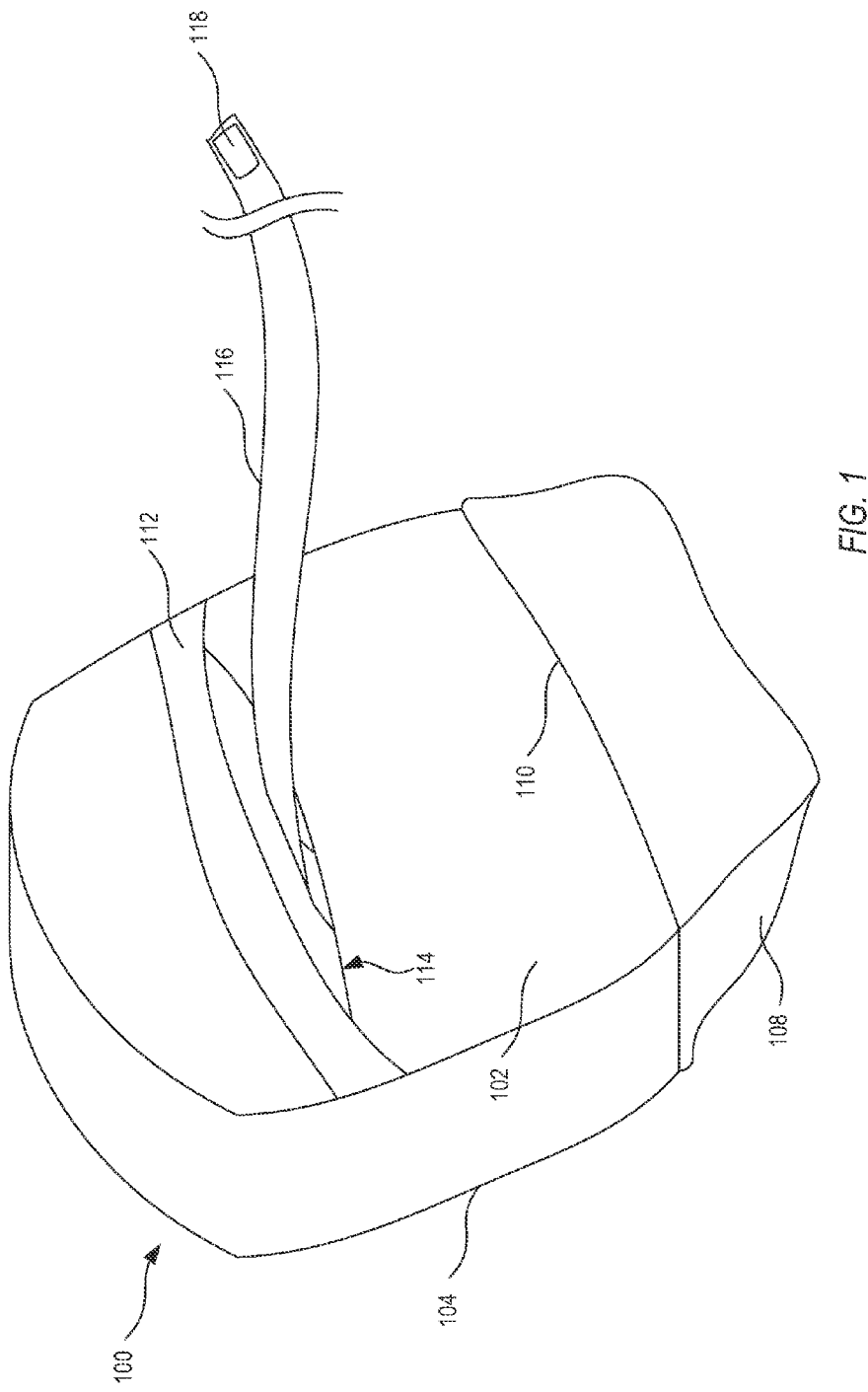
FIG. 1 shows a perspective view of a backrest cushion with a front closure, according to an example.

FIG. 1 shows a perspective view of a backrest cushion 100 with a front closure 114, according to an example. As used herein, the term "closure" refers to devices and methods used to close off or prevent further access to the internal cavities and/or compartments in the backrest cushion. Suitable closures that can be used in the invention include, but are not limited to, latching doorways, pivotally mounted locking and/or latching door or hatchways, hook-and-loop, buttons, zippers, snaps, grommets, and combinations thereof. A door or flap 112 can be mounted on the front surface 102 of the backrest cushion housing 104 so that access can be available to the cavity located therein.

The housing 104 can be formed of a single piece of material where the ends can be attached to each other by way of closure 114. Padding for the backrest cushion 100 can include a motorcycle cover, and/or other articles, including, but not limited to, clothing, rain gear, foam, other pliable articles, and combinations thereof. The cover can be formed from any cover materials known in to be light weight, and resistant to one or more of water, transmitting light and tearing in the wind. Suitable materials can include, but are not necessarily limited to, plastics, canvas, leather, and combinations thereof. Suitable plastics include, but are not limited to, polyesters, polyethylene terephthalate, polyurethanes, polycarbonates and combinations thereof.

The flap 112 can cover an opening of the closure 114. The flap 112 can be stretched taught against another portion of the housing to keep articles disposed therein relatively well-protected from the elements. Fasteners, such as hook-and-loop fasteners or a zipper, can be used to maintain the closure 114 closed. The flap 112 and closure 114 can traverse the width of the cushion 104 from one edge to another. The flap 112 and closure 114 can be placed in the middle of backrest cushion 100. A portion of the backrest cushion housing 104 can contain an auxiliary padding such as foam, to augment cushion provided by the cover when stowed. Accordingly, the stiffness and location of the cushioning can be tailored to suit an individual rider.

A bottom portion 108 of the backrest cushion housing 104 can extend away from the housing, such as downward. The bottom portion can be affixed to a motorcycle, such as under the seat of the motorcycle, to a component of the motorcycle, for example. The bottom portion 108 can be coupled to the housing 104 along a seam 110.

A lanyard 116 can be affixed to the backrest cushion 100. The lanyard can include a lanyard fastener 118. The fastener 118 can couple the lanyard to a cover. The lanyard fastener 118 can include at least one of a hook-and-loop fastener, a button, a zipper, a magnet, a peg and grommet, and combinations thereof. In an example, the lanyard fastener 118 can include a portion of a hook-and-loop fastener, and a cover can include a mating portion of the hook-and-loop fastener. The lanyard can be sewn to an inner portion of the backrest cushion 100, for example. The lanyard can be useful to help the rider unfurl the cover from the housing 104 without letting the cover touch the ground and become dirty.

The present subject matter is not limited to examples in which the cover is coupled with the backrest cushion housing via a lanyard, and can include examples in which the cover is directly coupled to some portion of the backrest cushion housing.

The backrest cushion housing 104 can be affixed to a backrest with fasteners. As mentioned elsewhere, the cushion 100 can be retrofit into an existing backrest cushion configuration using existing fasteners. Fasteners can include, but are not limited to, screws and rivets, hooks, braces, sleeves and/or straps. Magnets can be installed in the backrest cushion housing which can provide a means of attaching backrest cushion to a ferrous portion of a backrest.

The backrest cushion 100 can be constructed of any suitable material. Suitable materials can include, but are not necessarily limited to, plastics, canvas, leather, and combinations thereof. Suitable plastics include, but can be not limited to, polyesters, polyethylene terephthalate, polyurethanes, polycarbonates and combinations thereof. The backrest cushion housing 104 can be lined with a water-resistant lining that can protect exterior leather from interior moisture, such as when the cover is put away while wet. The lining can be breathable, to allow the cover to dry over time. The backrest cushion housing 104 can also include weep-holes to further promote drying.

In an alternative example, a rigid box can be used to store the cover. The hard box can include padding on one side thereof to provide cushioning for the rider. The rigid box can be constructed of any suitable material. Suitable materials can include, but are not necessarily limited to, plastics, metals, canvas, leather, and combinations thereof. Suitable plastics include, but are not limited to, polyesters, polyethylene terephthalate, polyurethanes, polycarbonates and combinations thereof. Suitable metals include, but are not limited to, steel, stainless steel, aluminum, and alloys and combinations thereof.

Figure 2:
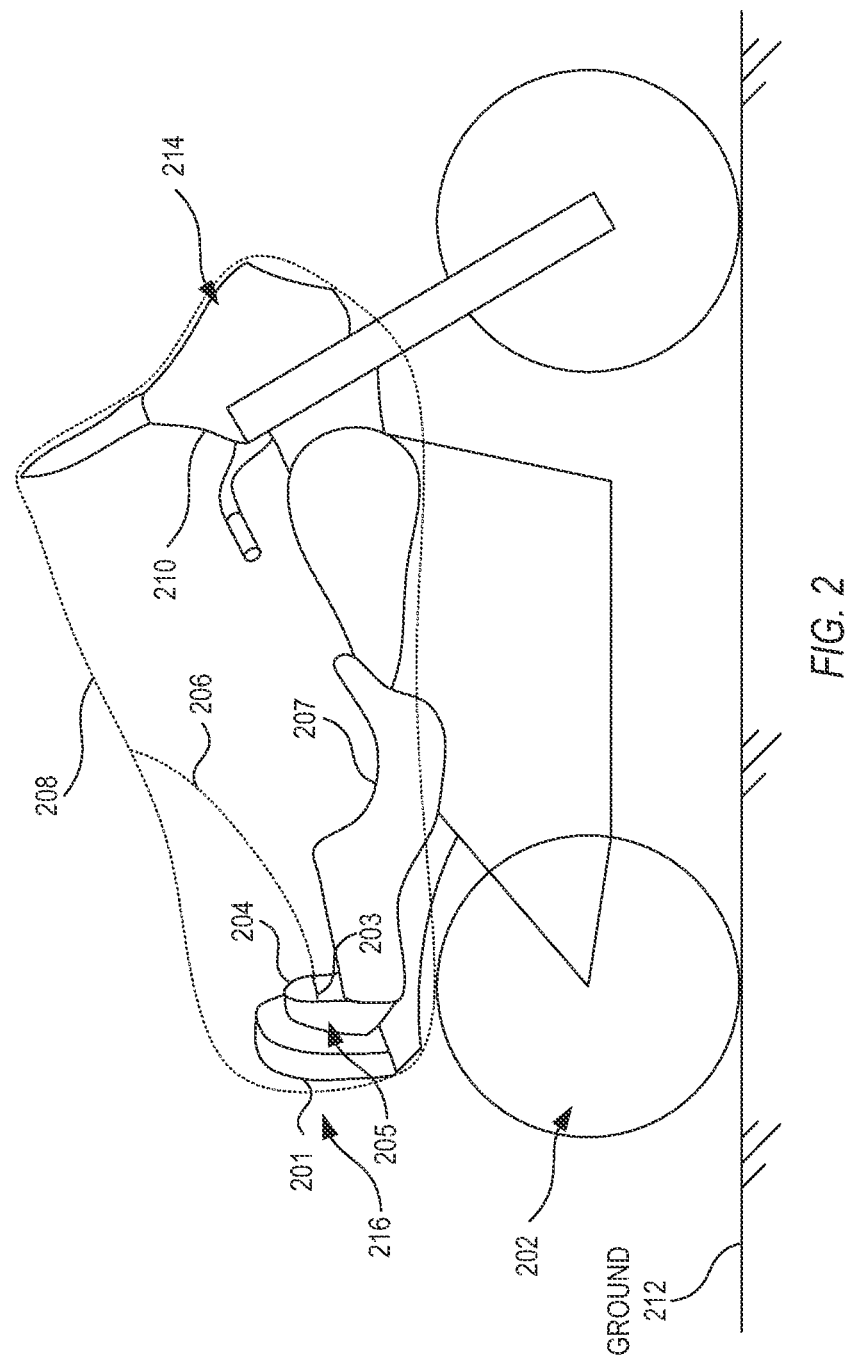
FIG. 2 shows a side view of a cover deployed from a backrest cushion affixed to a passenger backrest, according to an example.

FIG. 2 shows a side view of a cover 208 deployed from a backrest cushion 205 affixed to a passenger backrest 201, according to an example. The backrest cushion 205 can be mounted against a fixed backrest 201 of the motorcycle 202. The backrest cushion housing 204 can be sized to extend away from the motorcycle 202, for example above the motorcycle seat 207. The backrest cushion housing 204 can extend at least a lumbar height of a rider, for example a passenger. The height from the motorcycle to an opening 203 in the backrest cushion housing 204 can be up to 16 inches, in some cases up to 14 inches and in other cases up 12 inches. Also, the thickness of the backrest cushion housing 204 can be at least 2 inches, in some cases at least 4 inches and in other cases at least 6 inches.

The backrest cushion housing 204 can define an inner cavity accessible through the opening 203. The cover 208 can be stowed in the backrest cushion housing 204. The example can include a configuration wherein in a stowed mode of operation the backrest cushion housing 204 defines the backrest cushion 205 with padding for the cushion including the cover 208.

The rider or passenger can rest their back against and be supported by backrest 201 and can be cushioned by backrest cushion 205. The backrest cushion housing 204 can be attached to a front of motorcycle rider backrest 201. Such a backrest is alternatively termed a sissy bar or sister bar.

Backrest cushion 205 can be configured to mount behind a motorcycle seat 207. The bottom of backrest cushion housing 204 can be positioned below the seat 207, and can even fold under the seat. For example, a bottom portion can include elastic material that can slide under the one-piece motorcycle seat 207 to aid in securing the cushion 205 in place.

In a deployed mode of operation the cover 208 can extend around a front portion 214 of the motorcycle 202. The cover 208 can extend around a rear portion 216 of the motorcycle. The cover 208 can extend around instruments 210 of the motorcycle. The cover 208 can extend around the motorcycle seat 207 and the backrest cushion 204 as well. The cover 208 can comprise a half-cover.

As illustrated, a lanyard 206 can be coupled between the backrest cushion housing 204 and the cover 208. The lanyard 206 can be stowable in the backrest cushion housing 204. The lanyard 206 can fix the cover 208 to the backrest cushion in a partially-installed-cover mode of operation. For example, on a windy day, once one begins to extract the cover 208 from the housing 204, and fit the cover 208 onto a portion of the motorcycle 202, such as the front portion (see FIG. 6 for a variation) or the rear portion (see FIG. 7 for a variation), the remainder of the cover can slide off a seat or otherwise blow out of control, possibly even onto the ground 212. Since fitting a cover to a portion of a motorcycle typically requires the use of both hands, the cover is free to move and the operator can find it difficult to control the cover. Thus, the lanyard 206 can support the cover 208 off the ground 212 while the cover 208 is being fitted into place.

Figure 3:
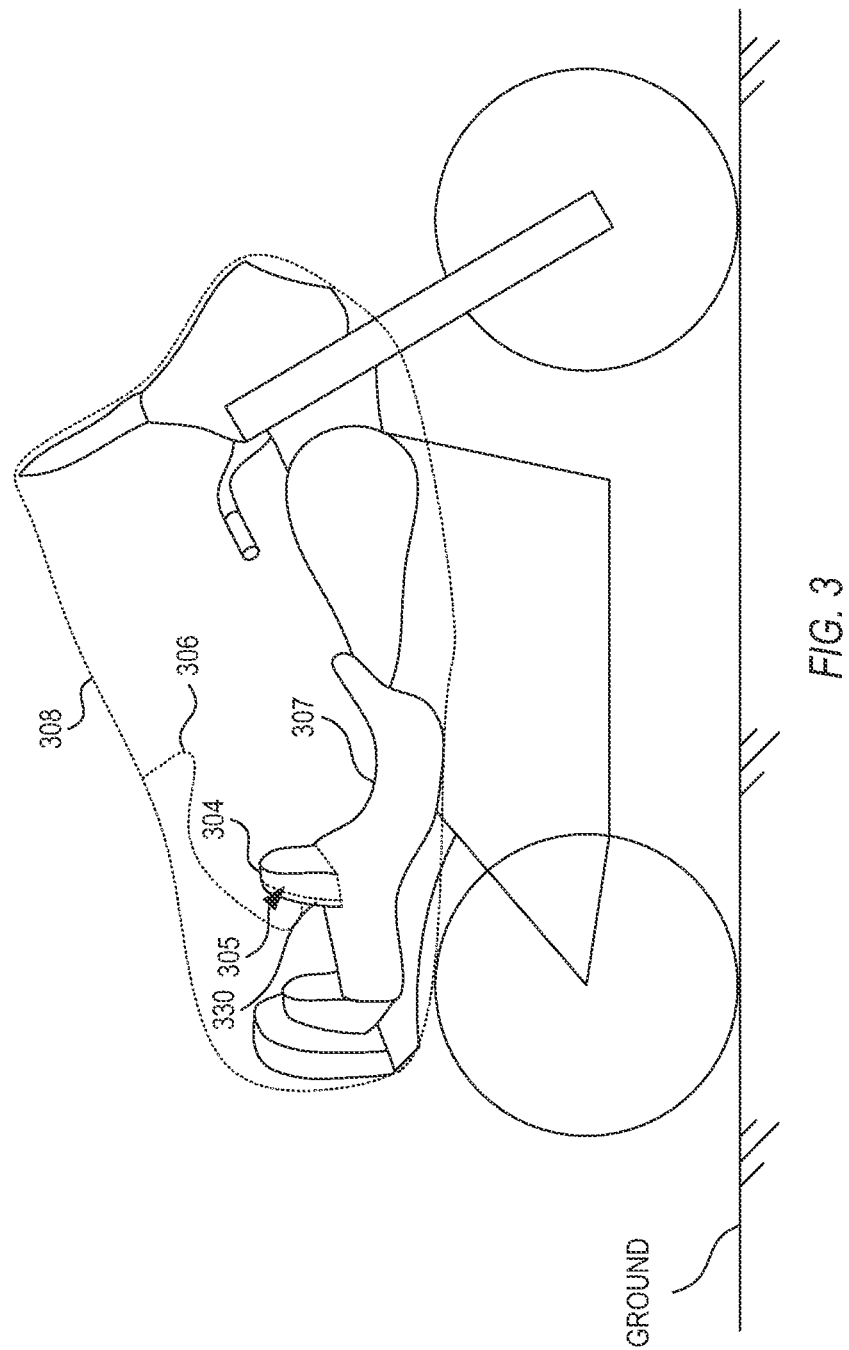
FIG. 3 shows a side view of a cover deployed from a backrest cushion affixed to a driver backrest, according to an example.

FIG. 3 shows a side view of a cover 308 deployed from a backrest cushion 305 affixed to a driver backrest, according to an example. The backrest cushion 305 assembly can be formed as part of a backrest of a driver motorcycle seat 307. The cushion 305 can include a frame 330 to provide support. The frame 330 can be internal or external. In an external embodiment, the dashed lines of the illustrated cushion 305 would be solid.

The seat 307 can include one or more female anchors to receive a male connector of the backrest cushion 305. Such a male connector can be coupled with the internal frame of the cushion 305. A rigid frame can be retrofit with a housing to store the cover 308, and optionally, a lanyard 306. For example, in one method, a motorcycle owner could remove an original-equipment driver seat, deconstruct the original-equipment cushion housing and padding, and modify or replace the original cushion housing such that it defines a housing 304 sized to receive a cover 308 and lanyard 306 which can form at least a portion of the padding ultimately relied upon for comfort. Alternatively, a housing can be affixed over an original-equipment cushion. In some examples, the cushion can have additional padding.

The backrest cushion housing 304 can define an inner cavity accessible through an opening 303. The cover 308 can be stowed in the backrest cushion housing 304. The example can include a configuration wherein in a stowed mode of operation the backrest cushion housing 304 defines the backrest cushion 305 with padding for the cushion including the cover.

As illustrated, a lanyard 306 can be coupled between the backrest cushion housing 304 and the cover 308. The lanyard can be stowable in the backrest cushion housing 304. As illustrated, an opening through which the cover is stowed can be located in the rear of the driver cushion 305. Alternatively, the opening can be located on the top of the cushion 305.

Figure 4:
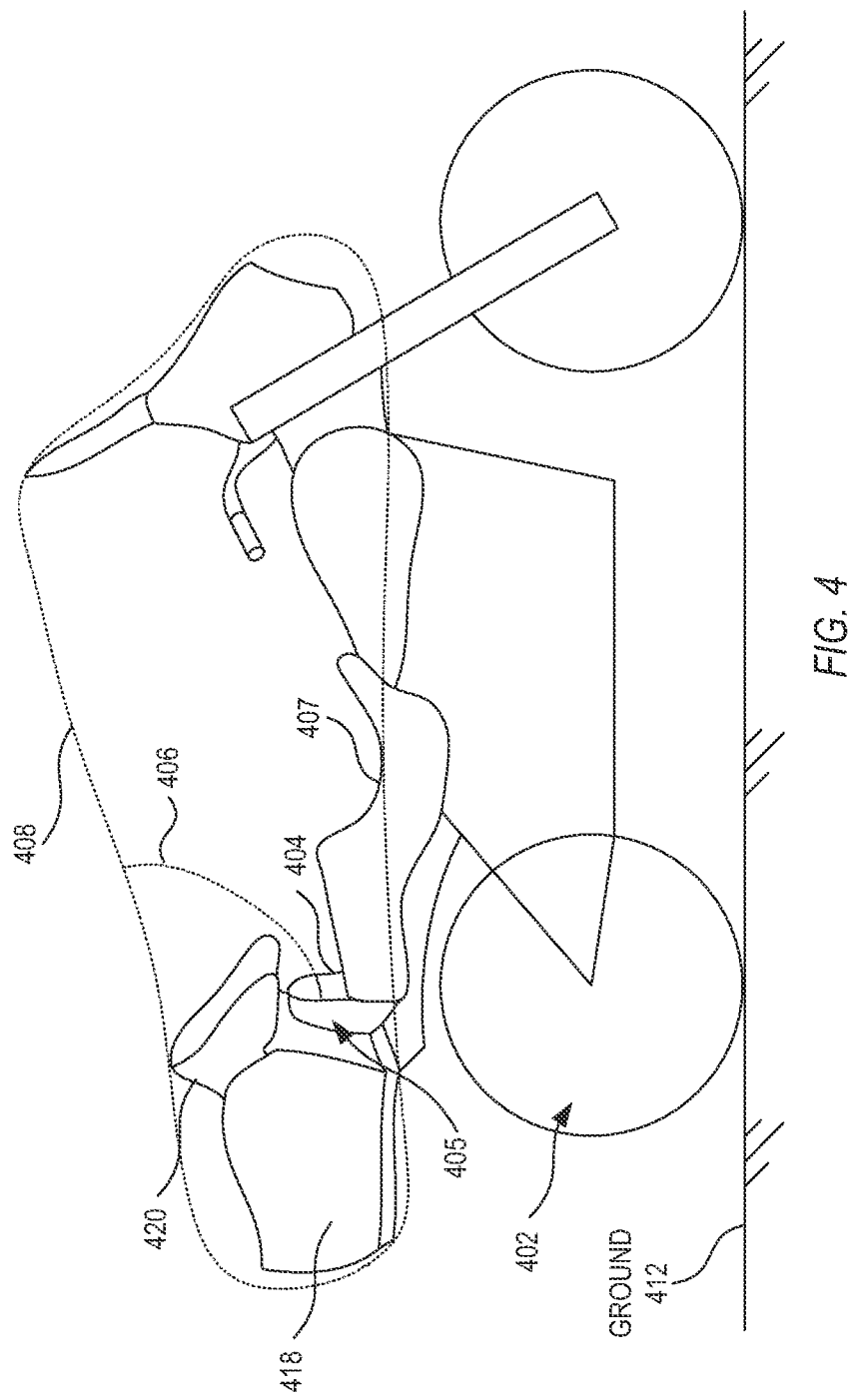
FIG. 4 shows a side view of a cover deployed from a backrest cushion affixed to a top case, according to an example.

FIG. 4 shows a side view of a cover 408 deployed from a backrest cushion 405 affixed to a top case, according to an example. The backrest cushion housing 404 is mountable to a top case 418 of the motorcycle 402. In some cases, the housing 404 can be retrofit in place of an original-equipment cushion.

The backrest cushion housing 404 can be located below a shoulder cushion 420 affixed to the top case 418. The backrest cushion housing 404 can be adapted to be removably mounted behind the seat 407 of the motorcycle 402. The cushion 405 can be shaped to fit between the shoulder cushion 420 and the seat 407 and can be contoured to complement the passenger seating area. In an example, the shoulder portion 420 can extend forward to accommodate a portion of the pressure exerted by the passenger. For example, the shoulder portion 420 can reduce the amount of pressure placed on the cushion 405 by the passenger.

The backrest cushion housing 404 can be attached to the top case 418 by means of fasteners, such as screws that can be threadably attached to holes in the top-case or in a bracket attached thereto. As mentioned elsewhere, the cushion can be retrofit into an existing backrest cushion configuration using existing fasteners. Fasteners can include, but are not limited to, screws and rivets, hooks, braces, sleeves and/or straps. Magnets can be installed in the backrest cushion housing which can provide a means of attaching backrest cushion 405 to a ferrous portion of a backrest.

As illustrated, a lanyard 406 can be coupled between the backrest cushion housing 404 and the cover 408. The lanyard 406 can be stowable in the backrest cushion housing 404. The lanyard 406 can fix the cover 408 to the backrest cushion 405 in a partially-installed-cover mode of operation. For example, on a windy day, once one begins to extract the cover 408 from the housing 404, and fit the cover 408 onto a portion of the motorcycle 402, such as the front portion (see FIG. 6 for a variation) or the rear portion (see FIG. 7 for a variation), the remainder of the cover can slide off a seat or otherwise blow out of control, possibly even onto the ground 412. Since fitting a cover to a portion of a motorcycle typically requires the use of both hands, the cover is free to move and the operator can find it difficult to control the cover. Thus, the lanyard 406 can support the cover 408 off the ground 412 while the cover 408 is being fitted into place.

Figure 5:
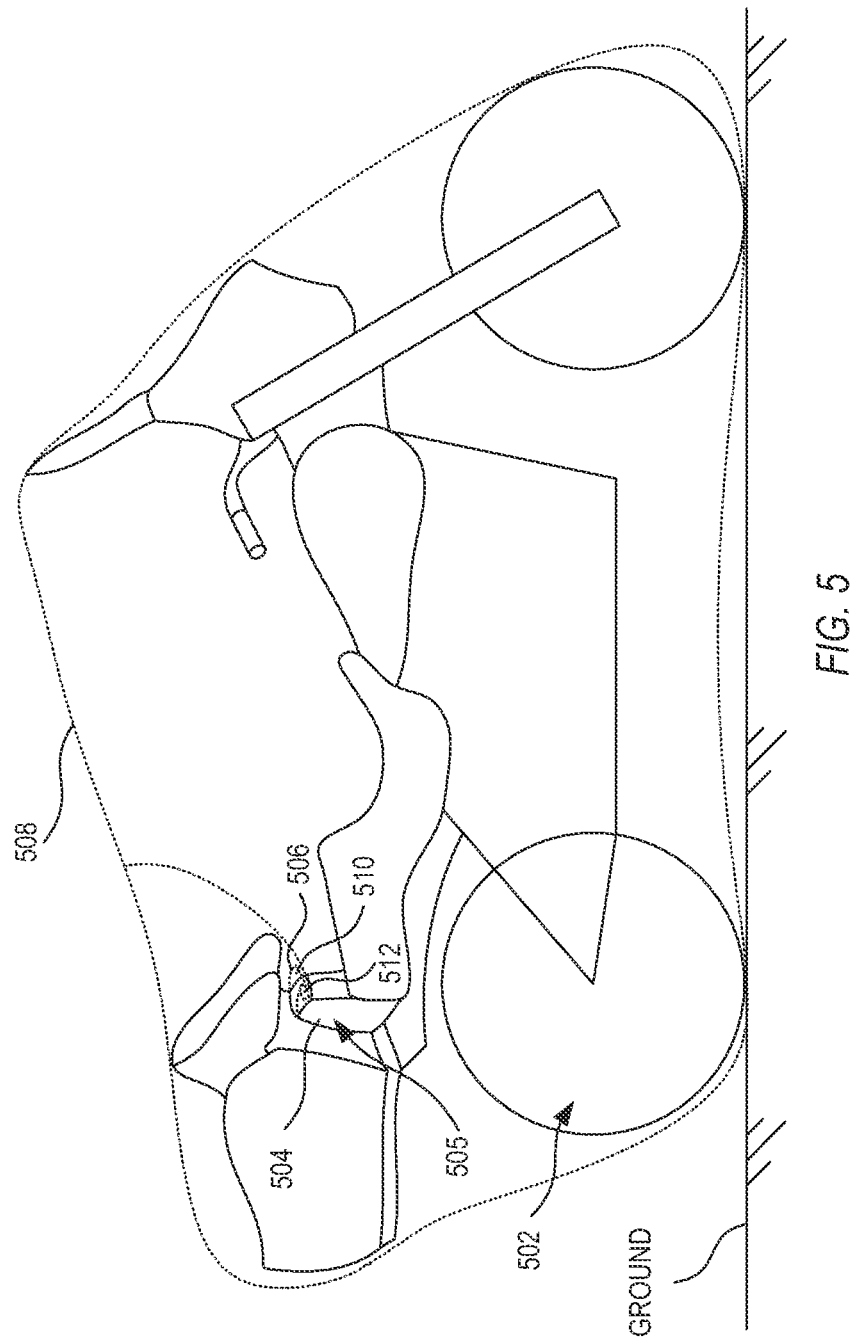
FIG. 5 shows a side view of a cover deployed from a backrest cushion affixed to a top case and covering wheels, according to an example.

FIG. 5 shows a side view of a cover 508 deployed from a backrest cushion 505 affixed to a top case and covering wheels, according to an example. In the illustration, a full-sized cover 508 (e.g., a full-cover) covers the front and rear wheels of the motorcycle 502. The cushion 505 can provide a means to store the cover 508 while isolating soil, such as from the front and rear wheels of the motorcycle 502, from other articles stored for travel, such as clothing. Thus, the cushion 505 can be lined with a water-resistant liner. The cushion 505 can include weep holes. A liner can be removable and washable. In the example, a flap 506 is shown providing a closure for a top-loading housing 504. The dashed lines represent the flap 506 in a flap-open mode of operation, and the solid lines show the flap 506 in a flap-closed mode of operation. The flap 506 can fold forward and can include an end-portion fastener 510, e.g. one portion of a hook-and-loop fastener, to fasten to a front portion 512 of the housing 504, e.g. a mating portion of a hook-and-loop fastener.

Figure 6:
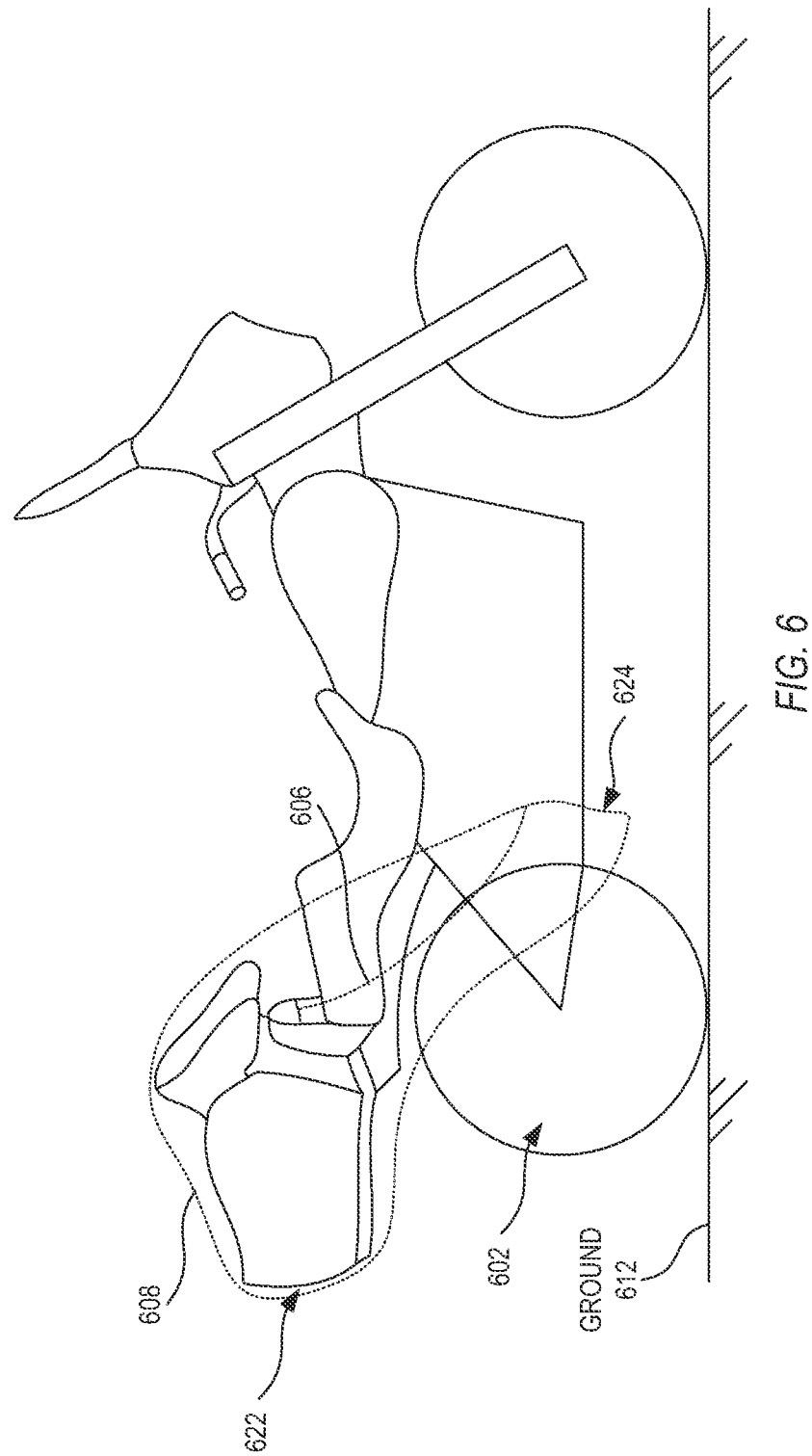
FIG. 6 shows a side view of a cover deployed from a cover hanging on a top case and from a lanyard, according to an example.

FIG. 6 shows a side view of a cover 608 deployed from a cover hanging on a top case and from a lanyard 606, according to an example. In the example, a rear portion 622 of the cover 608 extends around a rear of the motorcycle 602. The lanyard 606 can be sized to support the cover 608 off the ground 612. For example, a front portion 624 of the cover 608 can be supported off the ground 612.

Figure 7:
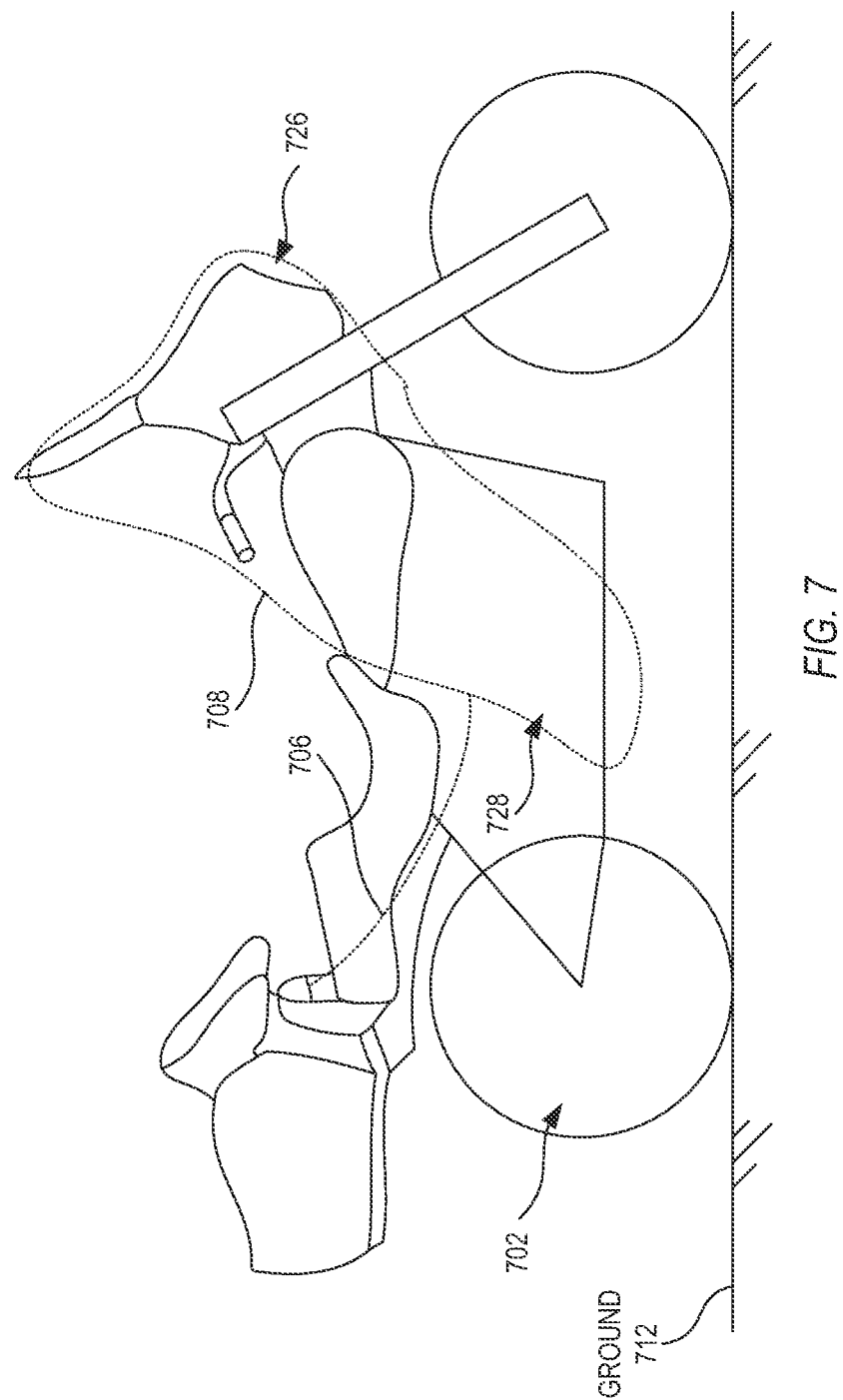
FIG. 7 shows a side view of a cover deployed from a cover hanging on a faring and from a lanyard, according to an example.

FIG. 7 shows a side view of a cover 708 deployed from a cover hanging on a faring and from a lanyard 706, according to an example. In the example, a front portion 726 of the cover 708 extends around a front of the motorcycle 702. The lanyard 706 can be sized to support the cover 708 off the ground 712. For example, a rear portion 728 of the cover 708 can be supported off the ground 712.

Figure 8:
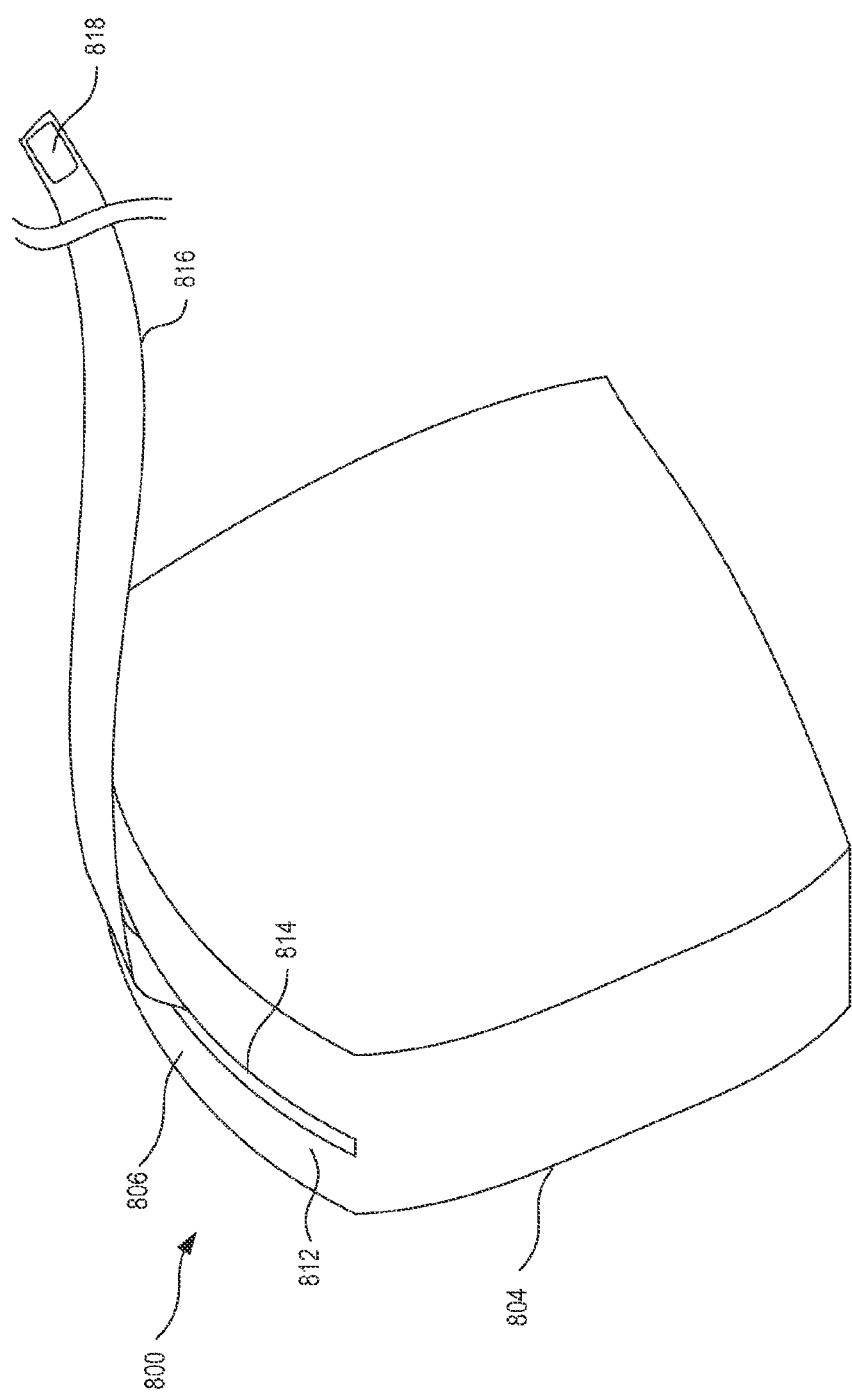
FIG. 8 shows a perspective view of a backrest cushion with a top closure, according to an example.

FIG. 8 shows a perspective view of a backrest cushion 800 with a top closure, according to an example. The backrest cushion 800 can be formed of a backrest cushion housing 804. An opening 814 can be mounted on the top surface 812 of the backrest cushion housing 804 so that access can be available to the cavity located therein. The opening 814 can include a zipper, however any of the closures detailed herein can be used. For example, a flap at the top can provide a closure for the housing. The flap can fold forward and can include an end-portion fastener to fasten to a front portion of the housing. Stitching can be placed along the edges of a one-piece compartment in order to make the edges more aesthetically pleasing and durable.

A lanyard 816 can be affixed to the backrest cushion 800. The lanyard can include a lanyard fastener 818. The fastener 818 can couple the lanyard 816 to a cover. The lanyard fastener 818 can include at least one of a hook-and-loop fastener, a button, a zipper, a magnet, a peg and grommet, and combinations thereof. In an example, the lanyard fastener 818 can include a portion of a hook-and-loop fastener, and a cover can include a mating portion of the hook-and-loop fastener. The lanyard 816 can be sewn to an inner portion of the backrest cushion 800, for example. The lanyard 816 can be useful to help the rider unfurl the cover from the housing 804 without letting the cover touch the ground and become dirty.

Figure 9:
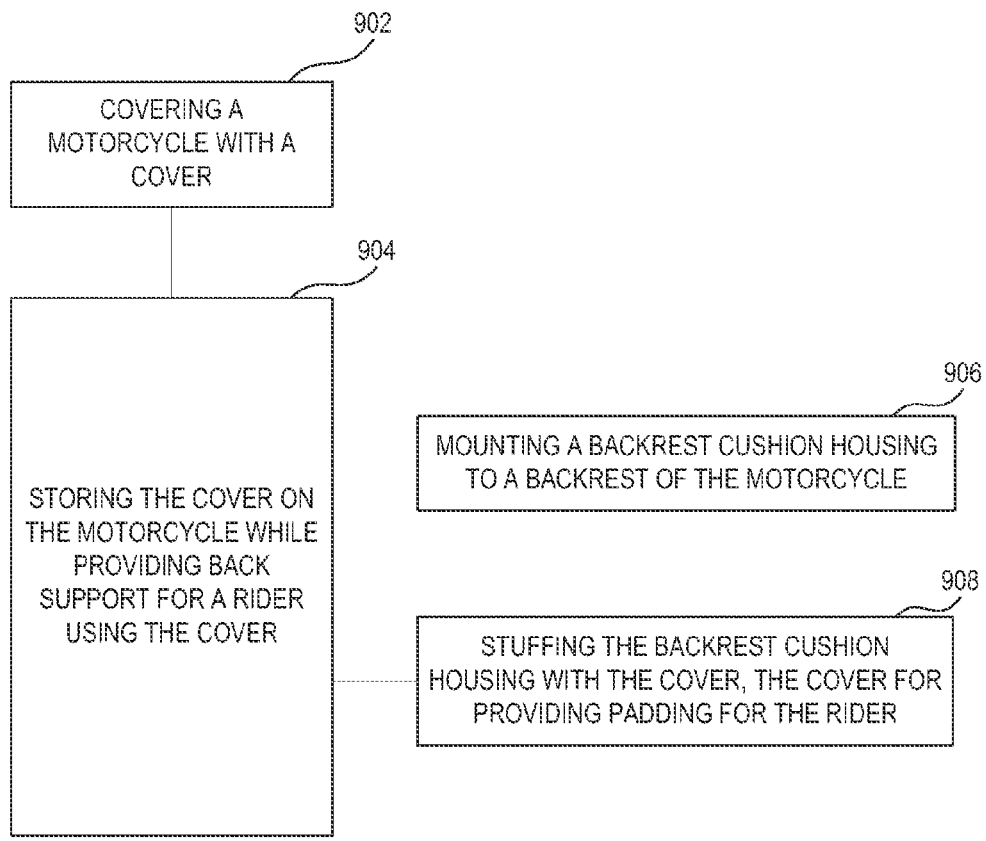
FIG. 9 shows a method of covering a motorcycle and using the cover as a backrest cushion, according to an example.

FIG. 9 shows a method 900 of covering a motorcycle and using the cover as a backrest cushion, according to an example. At 902, the method can include covering a motorcycle with a cover. At 904, the method can include storing the cover on the motorcycle while providing back support for a rider using the cover. At 906, this example can include mounting a backrest cushion housing to a backrest of the motorcycle, behind a motorcycle seat of the motorcycle, the backrest cushion housing extending away from the motorcycle, above the motorcycle seat to at least a lumbar height. At 908, storing the cover can include stuffing the backrest cushion housing with the cover, the cover for providing padding for the rider.

The above method, and other method examples disclosed herein, can include optional methods. An optional method can include covering an instrument of the motorcycle, a top case of the motorcycle, and the motorcycle seat. An optional method can include enveloping the instrument, the top case and the motorcycle seat. An optional method can include securing the cover to the backrest cushion housing with a lanyard. An optional method can include covering an instrument of the motorcycle and supporting the cover off of the ground with the lanyard. An optional method can include mounting the backrest cushion housing to the backrest including removing an original equipment backrest and installing the backrest cushion housing in the location of the original equipment backrest. An optional method can include installing fasteners in original equipment fastener locations.

In accordance with another example of the present disclosure, a cover assembly can be provided that is disposed within a compartment of the motorcycle, such as a side case (commonly referred to as a "saddlebag") or a top case. As will be discussed in further detail below, the cover assembly can be coupled to a lid of the side case or the top case. As appreciated by one of ordinary skill in the art, the volume defined by the interior of the lid of a side case or a top case is usually "wasted space" because items placed within this volume will fall out when the lid is moved from an "opened" position to a "closed" position. The cover assembly of the present disclosure can utilize this otherwise unusable space as a valuable storage alternative for a motorcycle cover.

Figure 10:
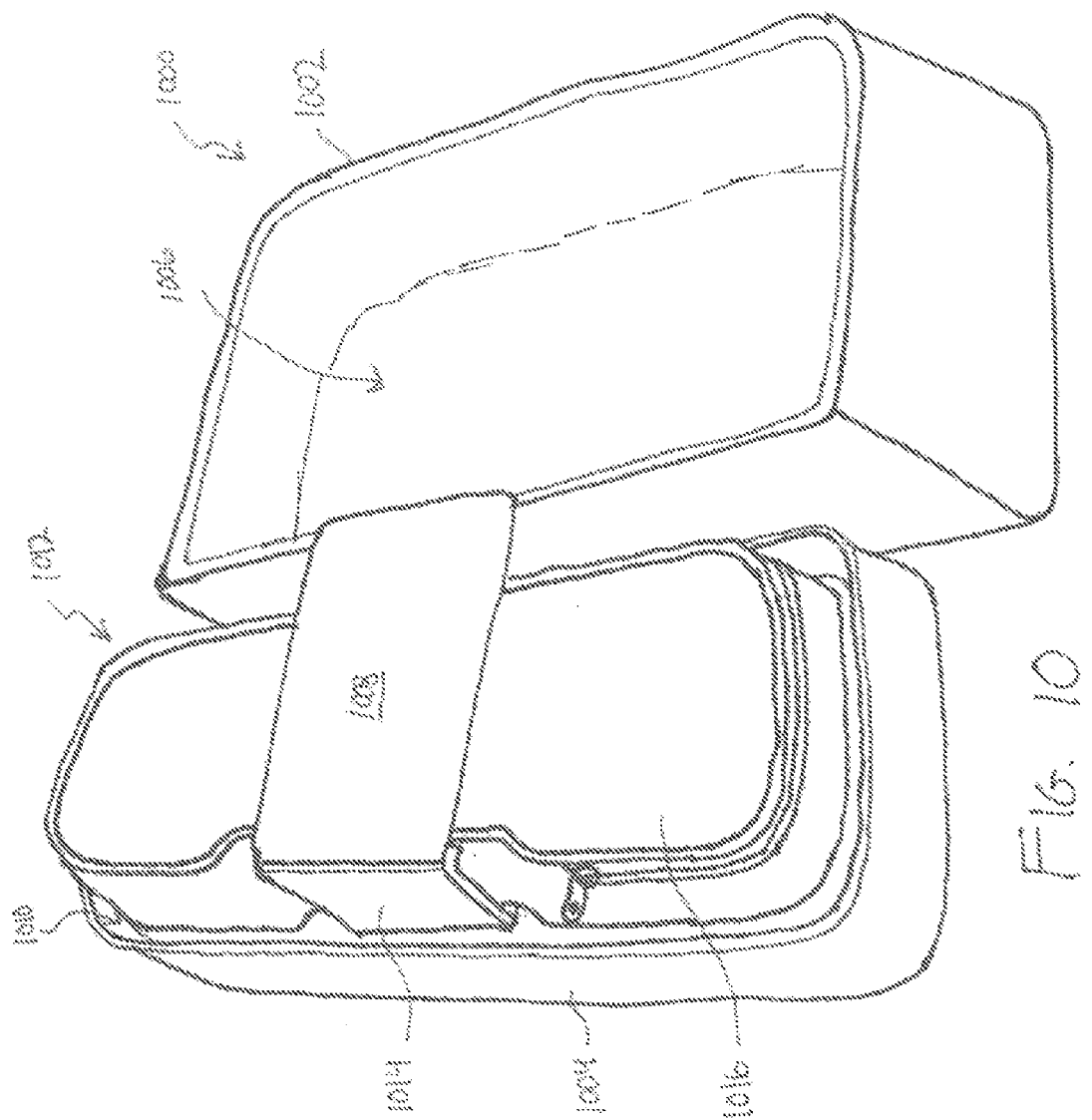
FIG. 10 shows a perspective view of a motorcycle cover assembly configured to be mounted within a motorcycle storage case, according to an example.

FIG. 10 is a perspective view of a motorcycle storage case 1000 including a main housing 1002 and a lid 1004, according to an example. As mentioned above, the storage case 1000 can be a side case, a top case, or the like. In order to simplify the discussion herein, the motorcycle storage case 1000 is depicted as being removed from the associated motorcycle. However, as will be appreciated by one of ordinary skill in the art, the storage case 1000 can include suitable mounting hardware configured for mounting the storage case 1000 to a desired location on the motorcycle.

As illustrated in FIG. 10, the lid 1004 has been lifted from the main housing 1002 into the opened position to provide access to an interior 1006 of the storage case 1000. The lid 1004 can be coupled to the main housing 1002 with any suitable hinge or retaining member, such as a flexible sheet 1008 as shown in FIG. 10, to prevent the lid 1004 from falling to the ground when removed from the main housing 1002. When the lid 1004 is returned to the closed position, the lid 1004 can be secured to the main housing 1002 with any suitable latching or locking mechanism.

With further reference to FIG. 10, the lid 1004 can define an interior 1010 that can be accessed when the lid 1004 is in the opened position. In accordance with the present disclosure, the interior 1010 of the lid 1004 can be configured to receive a cover assembly 1012. In an example, the cover assembly 1012 can include a mounting support or mounting member 1014 configured for attachment on a first side to an inner surface of the lid 1004 and on a second side to an end portion of the flexible sheet 1008, and a pouch 1016 configured to be positioned within the interior 1010 of the lid 1004 beneath the flexible sheet 1008. In various examples, the mounting member 1014 can be an "angle" bracket, such as an L-shaped bracket or a C-shaped bracket. The mounting member 1014 can be formed from any substantially rigid material, such as various metals or composites. Furthermore, the flexible sheet 1008 can be formed from any suitable material, including nylon, canvas, or the like.

The mounting member 1014 can be secured to the inner surface of the lid 1004 using any suitable fastening means including, but not limited to, screws, bolts, rivets, staples, an adhesive, or the like. Additionally, any suitable fastening means can be used to secure the mounting member 1014 to the end portion of the flexible sheet 1008, including those previously mentioned.

Figure 11:
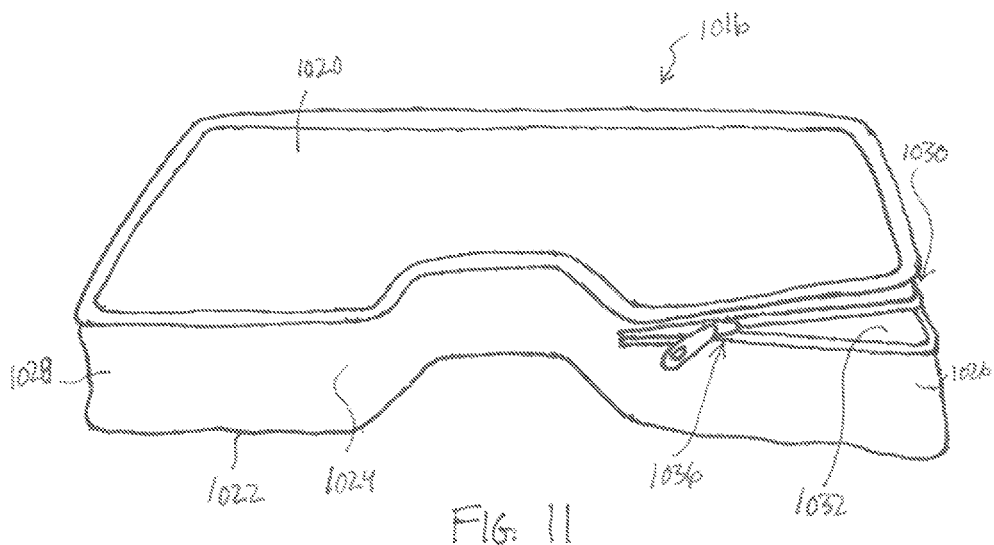
FIG. 11 shows a perspective view of a storage pouch of the cover assembly, according to an example.

FIG. 11 is a perspective view of the pouch 1016 removed from the lid 1004, according to an example. As illustrated in FIG. 11, the pouch 1016 can include first 1020 and second 1022 opposing sides, and a wall panel 1024 extending between the first side 1020 and the second side 1022. The first side 1020, the second side 1022, and the wall panel 1024 can be configured in any suitable shape to fit within the confines of a particular side case lid. Thus, the shape of the pouch 1016 shown in FIG. 11 is presented merely for purposes of example and not limitation.

The pouch 1016 can further define a first end portion 1026 and a second end portion 1028. At least one of the first end portion 1026 and the second end portion 1028 can include an access opening therein, such as access opening 1030 in the first end portion 1026 of the pouch 1016 as depicted in FIG. 11. The access opening 1030 can provide access to an inner cavity 1032 of the pouch 1016. The inner cavity 1032 of the pouch 1016 can be configured to hold one or more items, such as a motorcycle cover. The cover can comprise any suitable cover configured to surround at least a portion of a motorcycle, including but not limited to the covers discussed above with reference to FIGS. 2-7. In certain examples, a lanyard such as described with reference to the covers of FIGS. 2-7 can also be used to secure the cover to the pouch 1016 or the storage case 1000.

As further illustrated in FIG. 11, the pouch 1016 can include a closure mechanism ("closure") 1036 configured to close at least a portion of the access opening 1030. The closure 1036 can be used to, for example, ensure that the cover remains contained within the inner cavity 1032 of the pouch 1016 in a stowed mode of operation until a user desires to remove and utilize the cover in a deployed mode of operation. In an example, the closure 1036 can include a zipper as depicted in FIG. 11. However, any of the closures detailed herein can be used.

Figure 12A:
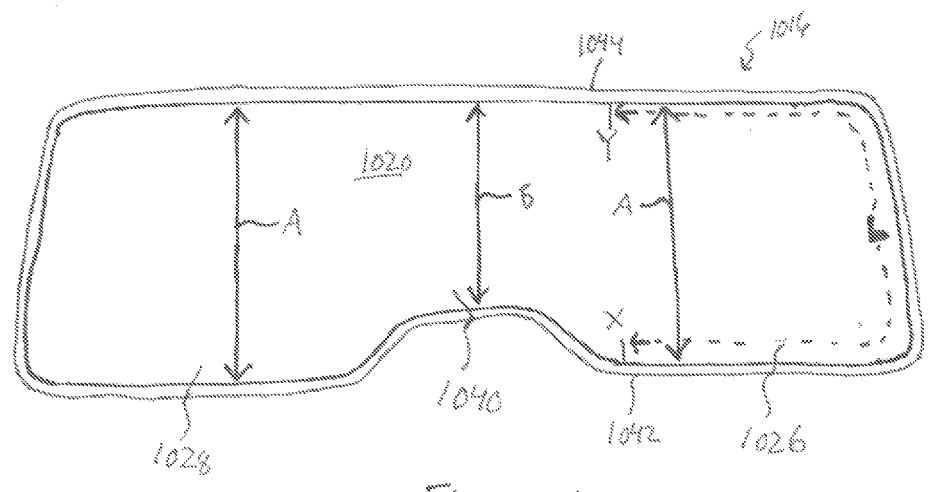
FIGS. 12A and 12B show opposing side views of the storage pouch, according to an example.
Figure 12B:
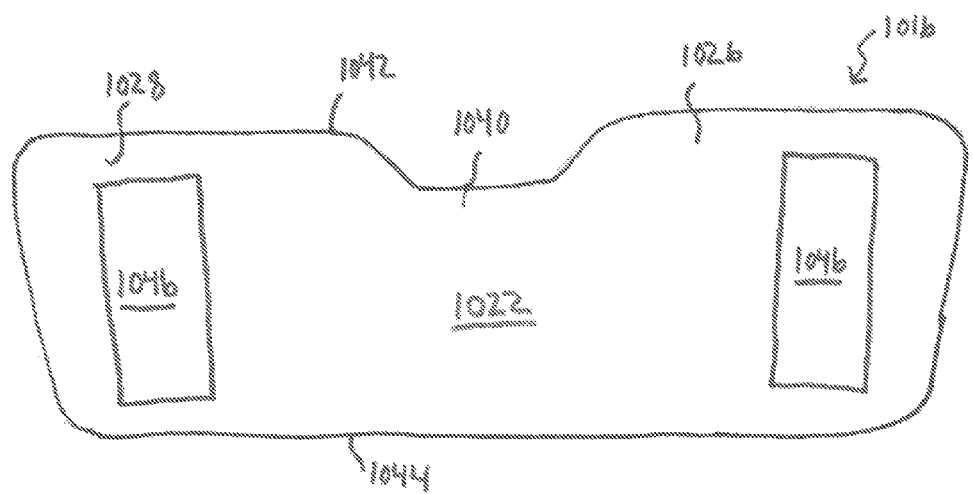

FIGS. 12A and 12B are views of the first side 1020 and the second side 1022 of the pouch 1016, respectively, according to an example. As illustrated in FIG. 12A, in addition to the first end portion 1026 and the second end portion 1028, the pouch 1016 can further include a center portion 1040. The first end portion 1026 and the second end portion 1028 can define a width A between a front wall surface 1042 and a rear wall surface 1044, and the center portion 1040 can define a width B between the front wall surface 1042 and the rear wall surface 1044. In an example, the width B of the center portion 1040 can be less than the width A of the first end portion 1026 and the second end portion 1028 to allow "nesting" of the mounting member 1014 within the center portion 1040 as illustrated in the assembled view of FIG. 10, which can maximize the size of the pouch that can fit within the interior 1010 of the lid 1004.

As further illustrated in FIG. 12A, in an example, the access opening 1030 can have a length L extending between a first location X on the first end portion 1026 and a second location Y on the first end portion 1026. The closure 1036 can extend the entirety of the length L, or alternatively can extend along only a portion of the length L. As will be appreciated by one of ordinary skill in the art, the length L of the access opening 1030 can be greater or less than that shown in various examples. Furthermore, one or more additional access openings can be provided in the pouch 1016, such as a second access opening that extends around the second end portion 1028 of the pouch 1016.

With reference to FIG. 12B, the second side 1022 of the pouch 1016 can include one or more attachment members 1046 configured to secure the pouch 1016 to an inner surface of the lid 1004. Any suitable attachment means can be used including, but not limited to, a hook-and-loop fastener, an adhesive, snaps, clips, or the like.

Figure 13A:
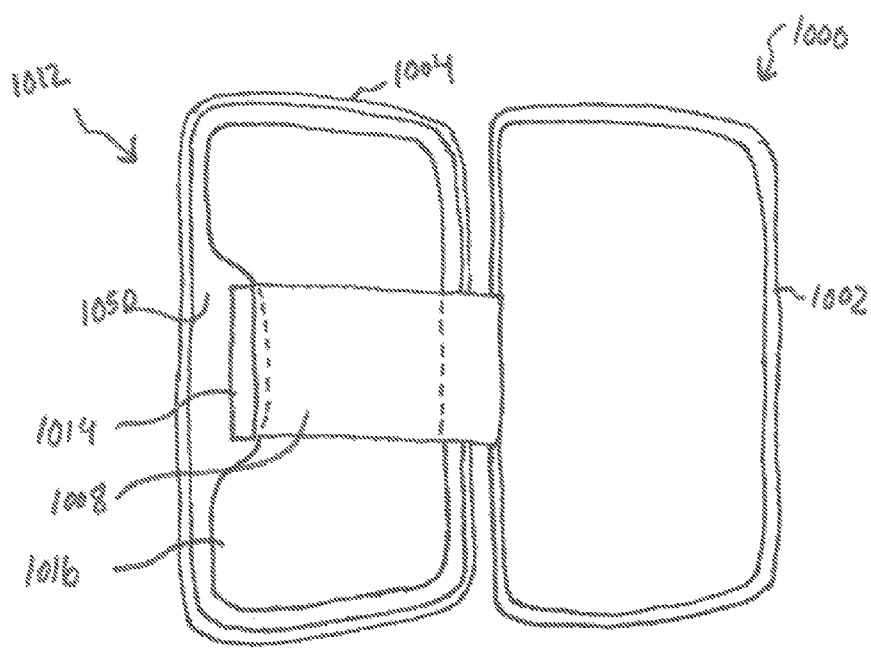
FIGS. 13A and 13B show top views of the motorcycle storage case depicting the removable coupling of the storage pouch within a lid of the storage case, according to an example.
Figure 13B:
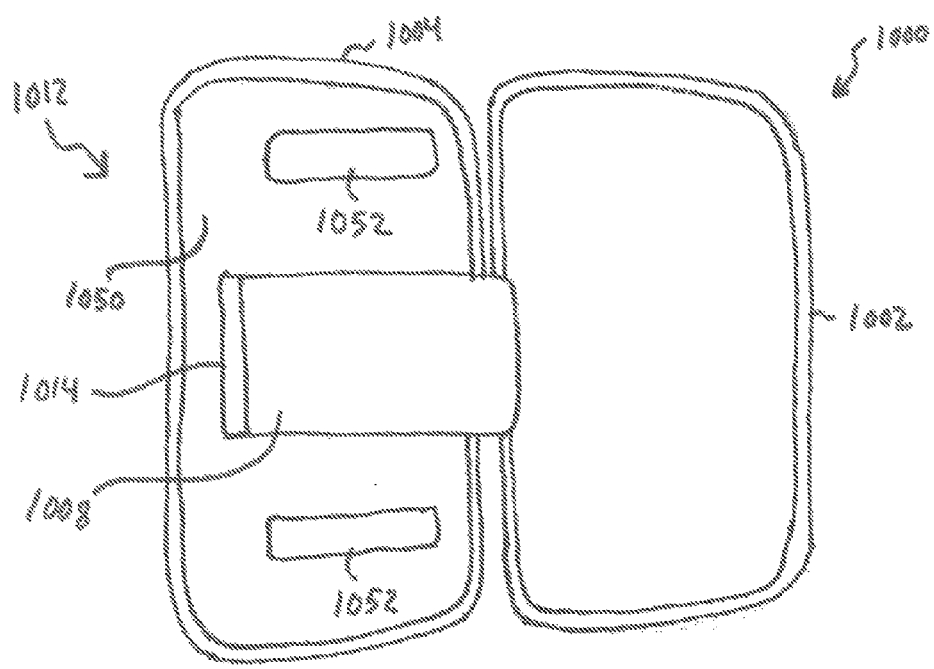

FIGS. 13A and 13B are top views of the motorcycle storage case 1000 in the opened position illustrating the temporary fixation of the pouch 1016 within the lid 1004. In particular, FIG. 13A depicts the pouch 1016 temporarily fixed to an inner surface 1050 of the lid 1004. As illustrated by the broken line portions of the pouch 1016 extending beneath the flexible sheet 1008, the pouch 1016 can be positioned in a space formed between the inner surface 1050 of the lid 1004 and the flexible sheet 1008.

FIG. 13B depicts the motorcycle storage case 1000 in the opened position with the pouch 1016 removed from the lid 1004. In an example, one or more attachment members 1052 can be provided on the inner surface 1050 of the lid 1004. The one or more attachment members 1052 can be complementary to the one or more attachment members 1046 on the pouch 1016 and can be configured to allow temporary fixation of the pouch 1016 within the interior 1010 of the lid 1004. Once again, any suitable attachment means can be used including, but not limited to, a hook-and-loop fastener, an adhesive, snaps, clips, or the like. In an example, the one or more attachment members 1046 on the pouch 1016 can comprise a first portion of a hook-and-loop fastener and the one or more attachment members 1052 on lid 1004 can comprise a second portion of a hook-and-loop fastener.

FIG. 14 is an enlarged perspective view of a portion of the storage case lid 1004 and the cover assembly 1012. The pouch 1016 has been removed from the interior 1010 of the lid 1004 to better illustrate the structure and function of mounting member 1014A, which is an alternative to mounting member 1014 of FIG. 10. As illustrated in FIG. 14, the mounting member 1014A can be a mounting bracket having one or more angled or bent sections. In an example, the mounting member 1014A can have a first section 1060 and a second section 1062 that can be substantially perpendicular to the inner surface 1050 of the lid 1004. The mounting member 1014A can further include a third section 1064 and a fourth section 1066 that can be substantially perpendicular to the first section 1060 and the second section 1062, respectively. The fourth section 1066 can be configured to engage the inner surface 1050 of the lid 1004 to provide stability. In an example, the third section 1064 can be positioned adjacent to one or more mounting features or posts 1068 extending from the inner surface 1050 of the lid 1004. The mounting member 1014A can be coupled to the one or more posts 1068 using one or more fastening members 1070 extending through the third section 1064. Any suitable fastening members can be used including, but not limited to, threaded fasteners such as screws or bolts, rivets, or the like.

As illustrated in FIG. 14, the mounting member 1014A can be configured to extend from the inner surface 1050 of the lid 1004 and provide a mounting location for the retaining member 1008 that is spaced apart from the inner surface 1050 to define the interior space for receiving the pouch 1016 within the lid 1004. The retaining member 1008 can be coupled to an upper surface 1072 of the mounting member 1014A using any suitable fastening means, including bolts, rivets, or screws 1074 as depicted in FIG. 14.

As will be appreciated by one of ordinary skill in the art, mounting members 1014 and 1014A are illustrated merely for purposes of example and not limitation. Thus, mounting members having different shapes, sizes, and configurations can be used without departing from the intended scope of the present disclosure. For example, the shape of the mounting member can be dependent on the presence or absence of mounting structures within the interior 1010 of the lid 1004, such as the mounting posts 1068 on the inner surface 1050 in FIG. 14. Thus, any mounting member configuration that allows the retaining member to be spaced apart from the inner surface 1050 of the lid 1004 can be used.

The above detailed description includes references to the accompanying drawings, which form a part of the detailed description. The drawings show, by way of illustration, specific embodiments that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for storing a cover for a motorcycle, comprising:
   a storage case mounted to a motorcycle, the storage case including a main housing and a lid;
   a storage pouch defining an inner cavity and at least one opening, the storage pouch configured to be mounted to the lid of the storage case;
   a cover, stowable in the inner cavity of the storage pouch in a stowed mode of operation, the cover configured to extend around at least a portion of the motorcycle in a deployed mode of operation;
   a mounting bracket mountable to an inner surface of the lid of the storage case; and
   a retaining member including a first portion mountable to the mounting bracket and a second portion mountable to the main housing of the storage case.

2. The system of claim 1, wherein the storage case is a side case of the motorcycle.

3. The system of claim 1, wherein the storage case is a top case of the motorcycle.

4. The system of claim 1, wherein in the deployed mode of operation the cover extends around at least one of a front of the motorcycle and a back of the motorcycle.

5. The system of claim 4, wherein in the deployed mode of operation the cover extends around the front of the motorcycle and the back of the motorcycle.

6. The system of claim 1, wherein the at least one opening of the storage pouch includes a closure.

7. The system of claim 6, wherein the closure comprises a zipper.

8. The system of claim 6, wherein the closure extends around an end portion of the storage pouch.

9. The system of claim 1, wherein the storage pouch is mountable to the inner surface of the lid with a hook-and-loop fastener.

10. The system of claim 1, wherein at least a portion of the mounting bracket extends substantially perpendicular to the inner surface of the lid.

11. The system of claim 1, wherein the storage pouch includes a first end portion, a second end portion, and a center portion, wherein a width of the center portion is less than a width of the first and second end portions.

12. A cover assembly for a motorcycle, comprising:
   a storage pouch defining an inner cavity and at least one opening;
   a cover stowable in the inner cavity of the storage pouch;
   a mounting member positionable within a motorcycle storage case, the motorcycle storage case including a main housing and a lid, the mounting member configured to be secured to an inner surface of the lid; and
   a retaining member configured to extend between the mounting member and the main housing of the motorcycle storage case;
   wherein the storage pouch includes at least one attachment member configured to allow removable attachment of the storage pouch to the inner surface of the lid.

13. The cover assembly of claim 12, wherein the at least one opening of the storage pouch includes a closure.

14. The cover assembly of claim 13, wherein the closure comprises a zipper.

15. The cover assembly of claim 12, wherein the mounting member is a mounting bracket configured to extend from the inner surface of the lid and provide a mounting location for the retaining member that is spaced apart from the inner surface.

16. The cover assembly of claim 15, further comprising at least one fastener for securing the mounting bracket to the inner surface of the lid.

17. The cover assembly of claim 15, wherein the at least one fastener is a threaded fastener.

18. The cover assembly of claim 15, wherein the at least one attachment member on the storage pouch comprises a first portion of a hook-and-loop fastener, and wherein a second portion of the hook-and-loop fastener is disposed on the inner surface of the lid.

19. The system of claim 12, wherein the storage pouch is positionable in a space formed between the inner surface of the lid and the retaining member.

20. A cover assembly for a motorcycle, comprising:
   a storage pouch defining an inner cavity and at least one access opening, the opening including a closure mechanism for temporarily closing the access opening;
   a cover positionable in the inner cavity of the storage pouch in a stowed mode of operation, the cover configured to extend around at least a portion of a motorcycle in a deployed mode of operation;
   a mounting member positionable within a motorcycle storage case, the motorcycle storage case including a main housing and a lid, the mounting member configured to be secured to an inner surface of the lid; and a retaining member configured to extend between the mounting member and the main housing of the motorcycle storage case;

wherein the storage pouch includes at least one attachment member configured to allow removable attachment of the storage pouch to the inner surface of the lid.

\* \* \* \* \*